Jan. 11, 1938.  M. P. BLOMBERG  2,104,787
BRAKE SLACK ADJUSTER
Filed Jan. 15, 1937  2 Sheets-Sheet 1

Inventor
Martin P. Blomberg
By Blackmore, Spencer & Hunt
Attorneys

Jan. 11, 1938.   M. P. BLOMBERG   2,104,787
BRAKE SLACK ADJUSTER
Filed Jan. 15, 1937   2 Sheets-Sheet 2

Inventor
Martin P. Blomberg
By Blackmore, Spencer & Flint
Attorneys

Patented Jan. 11, 1938

2,104,787

UNITED STATES PATENT OFFICE

2,104,787
BRAKE SLACK ADJUSTER

Martin P. Blomberg, Hinsdale, Ill., assignor to General Motors Corporation, Detroit, Mich., a corporation of Delaware Application January 15, 1937, Serial No. 120,653

16 Claims. (Cl. 188—197)

This invention relates to slack adjusters for railway vehicle brakes, and has for an object the provision of a device of this sort which will be simpler than those which have preceded it, because of the reduction of the number of parts employed, and which consequently will be lighter and more economical to produce.

Other objects and advantages will be apparent upon reference to the following specification and accompanying drawings, in which.

Figure 1:
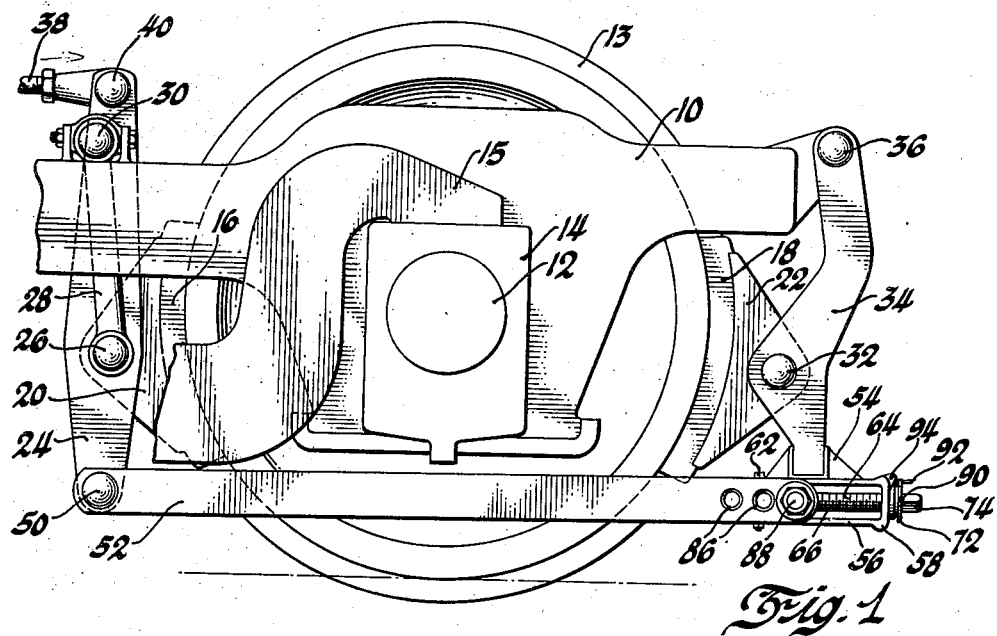
Fig. 1 is a side view of a portion of a railway vehicle truck showing one of the wheels and the brake rigging therefor, with my improved slack adjuster associated therewith.

The reference numeral 10 indicates the frame of a railway vehicle truck, in which the axle 12 carrying the wheels 13 is journalled in the usual manner, in journal boxes 14, and 15 is an equalizer bar, the ends of which rest on top of the journal boxes. The brakes illustrated are of the well-known clasp type and consist of brake shoes 16 and 18 adapted to be forced against the opposite sides of the wheel, the shoes being supported on brake heads 20 and 22, respectively. The brake head 20 is pivotally connected to an operating lever 24 at 26 and is supported by a pair of brake hangers 28 which are pivotally secured to the truck frame at 30, while the brake head 22 is pivotally connected at 32 to a lever 34, or if a pair of levers are employed at this point, as is the case in the structure illustrated, the brake head is pivotally connected at 32 between the pair of levers 34, the latter being pivotally supported at 36 from the truck frame. Pivotally secured to the lower end of the lever 24 by a pin 50 are a pair of tension rods 52, one of which is located inside the wheel while the other is on the outside thereof. A rod 38 pivotally secured at 40 to the upper end of the lever 24 is connected to the brake operating means which is not shown, the rod 38 being moved to the right, as viewed in Fig. 1, by the brake operating means when the brakes are to be applied.

Figure 2:
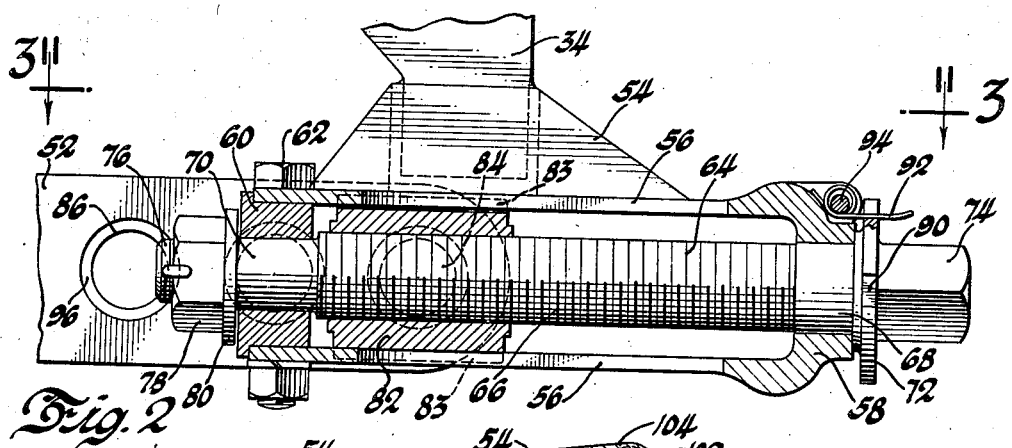
Fig. 2 is a sectional view of the slack adjuster, taken on the line 2—2 of Fig. 3.

Connected to the lower end of the lever or levers 34 in any suitable manner is a cross head 54 which in the embodiment illustrated is formed as a U-shaped member having leg portions 56 connected by a portion 58 at one end thereof, as best shown in Fig. 2. The opposite end of the cross head is closed at assembly by a block 60 which is secured to the leg portions by bolts 62, and the sides of the cross head are left open for a purpose to be presently described.

Located between the leg portions of the cross head is an adjusting screw 64 having threads 66 formed thereon, the screw being journalled at 68 in the central portion 58 of the cross head and at 70 in the block 60. This adjusting screw is provided with a head 72 and a polygonal shaped portion 74 at one end, and is threaded as at 76 at its opposite end to receive a nut 78, a washer 80 being interposed between the nut and the adjacent face of the block 60. It will be understood that as the screw is rotated for adjusting purposes, axial movement of it relative to the cross head is prevented by engagement of the head 72 with the cross head at one end and the washer 80 with the block 60 at the other end, so that the only movement of the adjusting screw is rotative.

Figure 3:
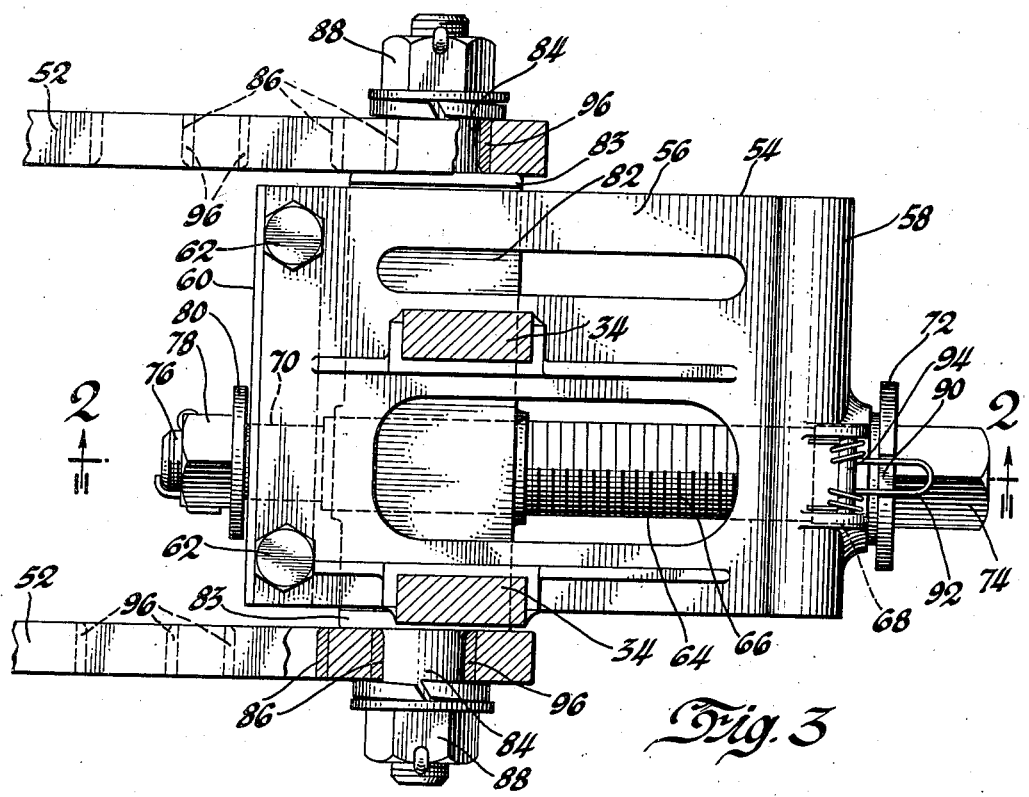
Fig. 3 is a view taken on the line 3—3 of Fig. 2, showing some of the parts in section.
Figure 4:
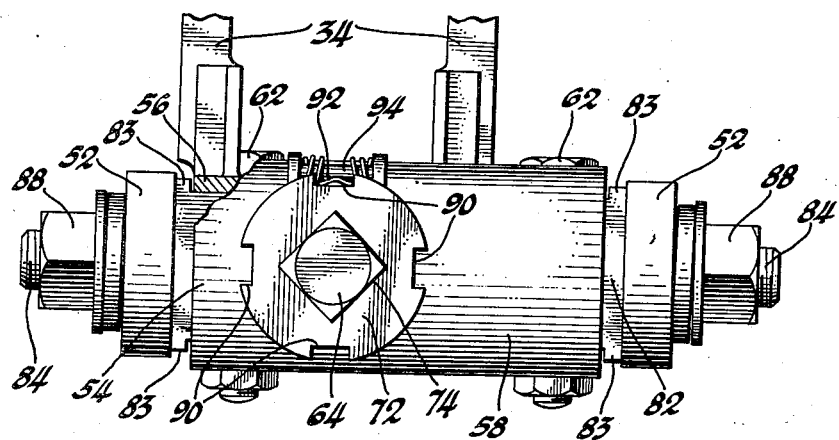
Fig. 4 is a view in elevation of the right-hand end of the structure shown in Fig. 3.

Slidably mounted between the leg portions of the cross head is a nut 82 having threaded engagement with the adjusting screw. This nut extends beyond the cross head at opposite sides thereof and flanges 83 are formed on the top and bottom faces of the nut at its outer ends, these flanges bearing against the side surfaces of the leg portions of the cross head to prevent tilting movement of the nut relative to the cross head. As best shown in Fig. 3, extending outwardly from each side of the nut are pin portions 84, which are adapted to extend through openings 86 in the rods 52, nuts 88 being threaded on the ends of the pin portions to secure the tension rods 52 in position thereon.

It will be obvious that as the adjusting screw is rotated by a wrench or suitable tool placed over the portion 74, the nut 82 will be caused to move endwise in the cross head in one direction or the other, depending upon which way the adjusting screw is rotated. Since the rods 52 are secured over the pin portions 84, as the nut is moved relative to the cross head, these rods will likewise be moved toward or away from the cross head, thereby changing the relationship of them to the levers 34. As the brake shoes become worn during use, the adjusting screw is turned in the direction which will cause the nut to move toward the head of the screw, with the result that the tension rods 52 are moved toward the cross head, thereby taking up the slack.

To hold the screw 64 in adjusted position, the head 72 has a plurality of notches 90 formed in it, and a spring member 92 secured about a pin 94 on the cross head is adapted to fit into one of these notches. It will be understood that when it is desired to turn the adjusting screw, the spring member is lifted out of the notch it has been in, and is held out until the screw has been turned the proper amount to obtain the desired adjustment, after which the spring member is released and drops into the nearest notch.

Figure 6:
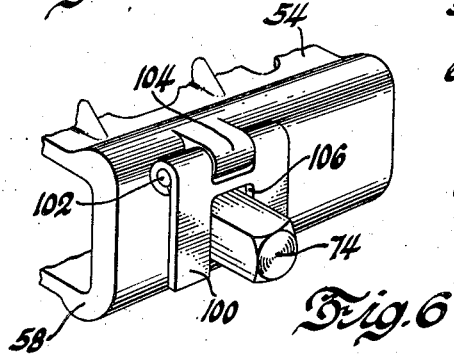
Fig. 6 is a perspective view of the parts shown in Fig. 5.
Figure 5:
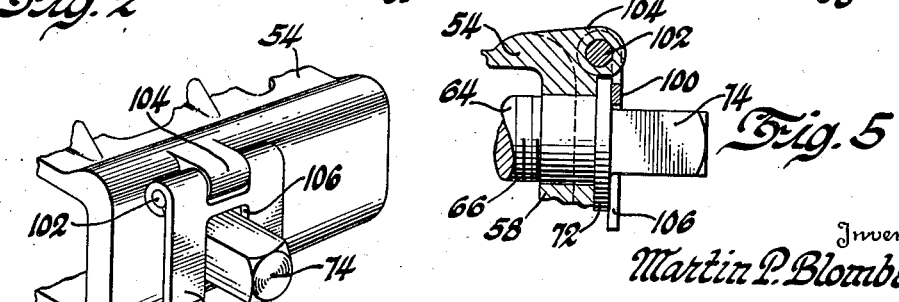
Fig. 5 is a fragmentary view corresponding to a part of Fig. 2, but showing a modified form of locking device.

In Figs. 5 and 6, another form of locking device is shown. In this form, a locking member 100 is pivotally secured to a pin 102 which is supported in a lug 104 formed on the cross head. The locking member has a slot 106 formed in it, and this slot is adapted to fit over the squared or polygonal portion 74 of the adjusting screw, the width of the slot being slightly greater than the distance between opposite faces of the polygonal shaped portion. The weight of the locking member tends to keep it in the position shown, but when it is desired to rotate the adjusting screw, the locking member is lifted up whereupon the screw may be turned, and when the locking member is allowed to drop down again, it will engage two opposite faces of the polygonal shaped portion, and will thereby serve to hold the adjusting screw in the position in which it has been set.

Since there is a possibility that if the brake shoes or wheels wear an excessive amount, the nut 82 may be moved as far as it can go in the cross head, additional openings 86 are provided in the tension rods 52, and if this occurs the nuts 88 are removed and the rods are slipped off the pin portions, and are then put back in place with the latter extending through the next set of openings 86, whereupon the nut 82 may be moved back to starting position in the cross head. If desired in order to prevent wear, the openings 86 in the tension rods may be provided with bushings 96.

It will be noted that by using this slack adjuster structure, wherein the additional sets of openings 86 are located at the slack adjuster ends of the tension rods 52, the entire structure is very accessible when it is necessary to adjust it to take up slack, since all parts thereof are located at the end of the truck where there are no other parts to interfere. The usual practice in brake rigging has been to provide the additional sets of openings at the ends of the tension rods nearest to the transverse center line of the truck, since because of the construction of the slack adjusters employed, it was impossible to locate them at the outer ends of the tension rods, but this has been found to be undesirable because the equalizer bars 15 extend in front of and immediately over the inner ends of the tension rods, thereby making it difficult or impossible to obtain access to these additional openings without running the vehicle over a pit.

It will be understood that if it is desired to prevent dirt from entering the slack adjuster structure, it may be encased with a housing, and by so constructing the housing that the polygonal shaped portion of the adjusting screw and the locking member are accessible from the outside thereof, the slack adjuster may be set to any desired position without removing the housing.

It will be understood that while I have shown and described a particular embodiment of my invention, various changes in the structure may be made without departing from the spirit and scope of the appended claims.

I claim:

1. In a brake slack adjuster, the combination of a tension rod, a lever, a guide having a slot formed therein connected to the lever, a member slidably mounted in the slot, said tension rod being connected to said member, and an adjusting screw rotatably mounted within said guide, said screw being in threaded engagement with said member and being adapted when rotated to move said member in said slot.

2. In a brake slack adjuster, the combination of a tension rod, a lever, a head having a slot formed therethrough connected to the lever, said slot being open at one side, a member slidably mounted in the slot, said tension rod being connected to said member, a block secured to said head in position to close the open side of the slot, and an adjusting screw journalled in said block, said screw being in threaded engagement with said member and being adapted when rotated to move said member in said slot.

3. In a brake slack adjuster, the combination of a tension rod, a lever, a U-shaped guide connected to the lever, a member slidably carried in said guide, said tension rod being connected to said member, and an adjusting screw rotatably mounted within said guide, said screw being threaded into said member and being adapted when rotated to move said member longitudinally in said guide.

4. In a brake slack adjuster, the combination of a tension rod, a lever, a cross head connected to said lever and having two spaced apart parallel side portions and a portion connecting the side portions at one end thereof, a member slidably supported between said side portions, and an adjusting screw journalled in said connecting portion of the cross head, said tension rod being connected to said member, said screw being in threaded engagement with said member and being adapted when rotated to move said member in said cross head.

5. In a brake slack adjuster, the combination of a tension rod, a lever, a guide having a slot formed therethrough connected to the lever, said slot being open at one side, a member slidably supported in the slot, said tension rod being connected to said member, a block secured in the guide in position to close the open side of the slot, an adjusting screw journalled in said block, said screw being in threaded engagement with said member and being adapted when rotated to move said member in said slot, and means on said screw cooperating with said guide and said block to prevent axial movement of said screw.

6. In a brake slack adjuster, the combination of a tension rod, a lever, a cross head having a slot formed therethrough connected to the lever, said slot being open at one side, a member slidably mounted in the slot, said tension rod being connected to said member, a block secured to said cross head serving to close the open side of the slot, an adjusting screw having one end rotatably supported in the cross head and the other end rotatably supported in the block, said screw being in threaded engagement with the member and having a portion adapted to engage the cross head to prevent axial movement of the screw in one direction, and means associated with said screw adapted to engage the block to prevent axial movement of the screw in the other direction.

7. In a brake slack adjuster, the combination of a tension rod, a lever, a cross head having a slot formed therethrough connected to the lever, a member slidably supported in said slot and having portions projecting beyond the cross head at opposite sides thereof, guiding flanges on said projections, said flanges being adapted to bear against the sides of the cross head, said tension rod being connected to said member, and an adjusting screw rotatably mounted within said cross head, said screw being in threaded engagement with said member.

8. In a brake slack adjuster, the combination of a tension rod, a lever, a head having a slot formed therein connected to the lever, a member slidably mounted in the slot, said tension rod being connected to said member, an adjusting screw rotatably mounted within said head, said screw being in threaded engagement with said member, and means adapted to lock said screw in adjusted position relative to said head.

9. In a brake slack adjuster, the combination of a tension rod, a lever, a head having a slot formed therein connected to the lever, a member slidably mounted in the slot, said tension rod being connected to said member, an adjusting screw rotatably mounted within the head, said screw being in threaded engagement with said member, and a locking member associated with said head, said locking member being adapted to engage a portion of said screw to hold the latter in adjusted position.

10. In a brake slack adjuster, the combination of a tension rod, a lever, a head having a slot formed therein connected to the lever, a member slidably mounted in the slot, said tension rod being connected to said member, an adjusting screw journalled in the head, said screw being in threaded engagement with said member, a portion of said screw having notches formed therein, and a spring member carried by said head adapted to be held in one of said notches to lock said screw in adjusted position.

11. In a brake slack adjuster, the combination of a tension rod, a lever, a U-shaped guide connected to the lever, a member slidably carried in said guide, said tension rod being connected to said member, an adjusting screw rotatably mounted within said guide, said screw being threaded into said member and being adapted when rotated to move said member in said guide, said screw having a polygonal shaped portion formed thereon, and a locking member pivotally secured to the guide, said locking member having a slot formed therein, the sides of the slot normally engaging the side faces of the polygonal shaped portion of the screw to hold the latter in adjusted position.

12. In combination with a brake rigging including a brake lever and a tension rod, a guide connected to the brake lever, a member slidably carried in the guide and connected to the tension rod, and an adjusting screw rotatably mounted within the guide and being in threaded engagement with said member whereby when said screw is rotated said member will be moved in said guide and the position of the tension rod relative to the brake lever will be changed.

13. In combination with a brake rigging including a brake lever and a pair of tension rods, a cross head connected to the brake lever, an adjusting screw rotatably mounted within the cross head, and a nut slidably supported in the cross head and having threaded engagement with the adjusting screw, one of said tension rods being connected to each side of said nut.

14. In a brake rigging, the combination of a brake lever, a cross head connected to said lever, a tension rod, a nut secured to said tension rod, said nut being slidably carried in said cross head, an adjusting screw rotatably mounted within said cross head and threaded into said nut, and means adapted to prevent axial movement of said adjusting screw in said cross head.

15. In a brake rigging, the combination of a brake lever, a pair of tension rods, a cross head connected to the lever, a nut secured to the tension rods between the latter and serving to space them apart, said nut being slidably supported in said cross head, and an adjusting screw rotatably mounted within said cross head, said screw being in threaded engagement with said nut.

16. In a brake rigging, the combination of a brake lever, a pair of tension rods, a cross head connected to the lever and having a slot formed therethrough, a nut slidably mounted in said slot and having pin portions extending beyond the cross head at each side thereof, one of said tension rods being secured to the pin portion of the nut at each side of the cross head, and an adjusting screw rotatably mounted within said cross head, said screw being in threaded engagement with said nut.

MARTIN P. BLOMBERG.